April 8, 1930.　　　J. VAN ACKEREN　　　1,754,131
COKING RETORT OVEN
Filed May 4, 1923　　10 Sheets-Sheet 6
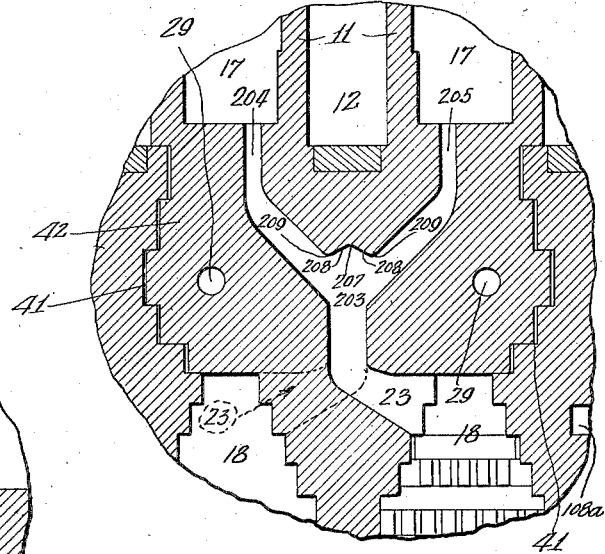
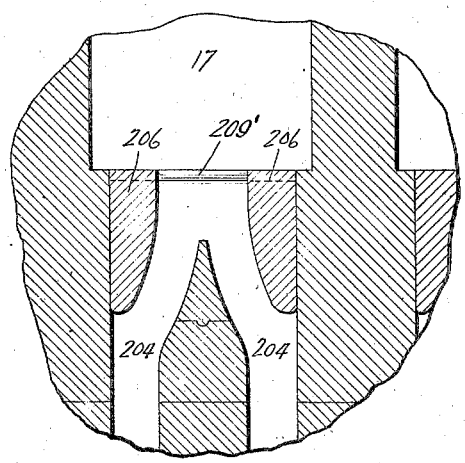
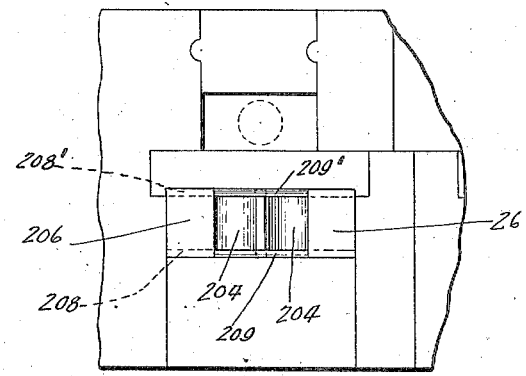
Inventor:
Joseph Van Ackeren

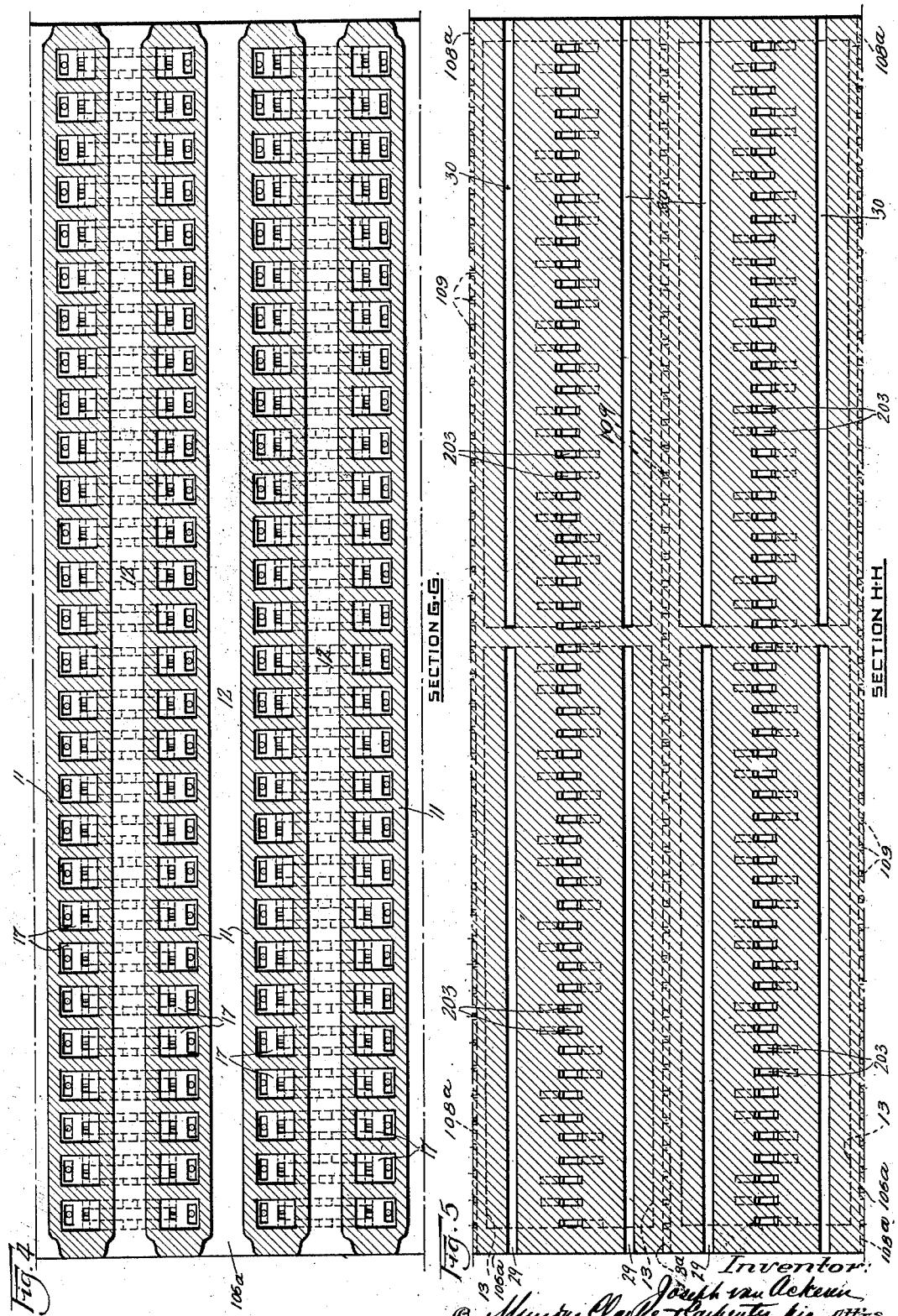

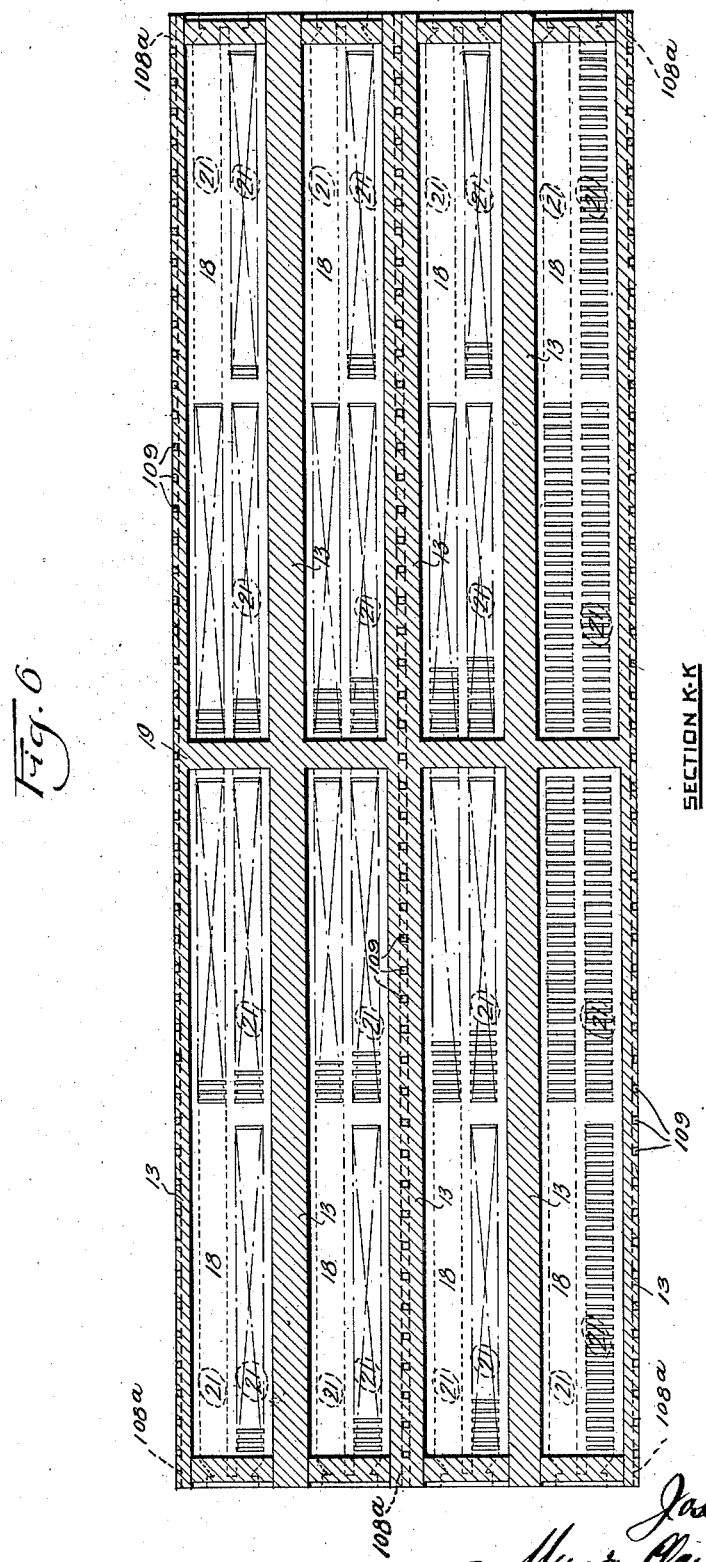

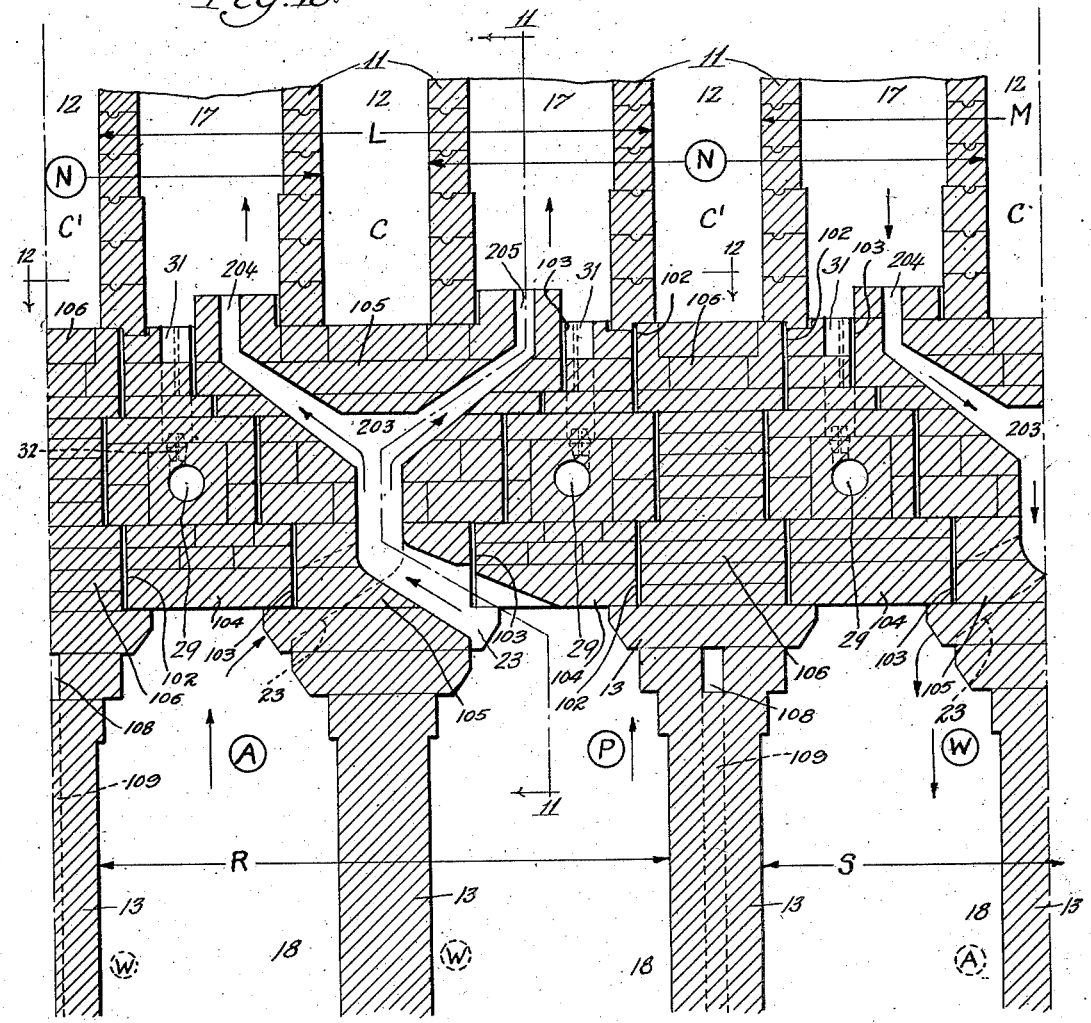

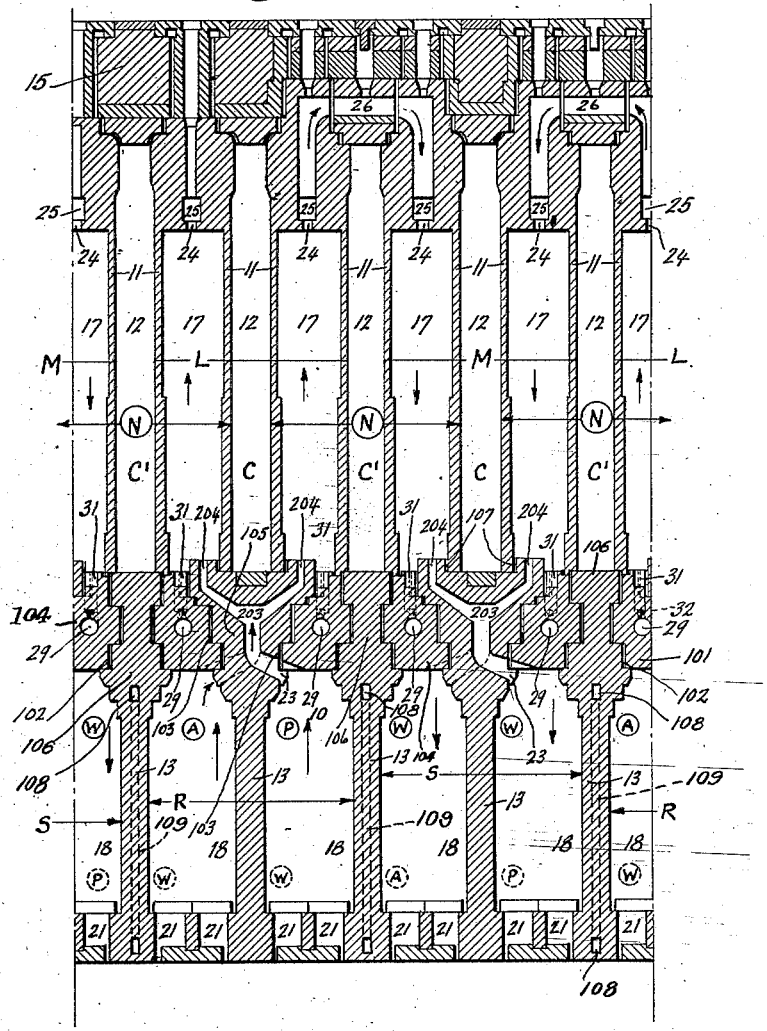

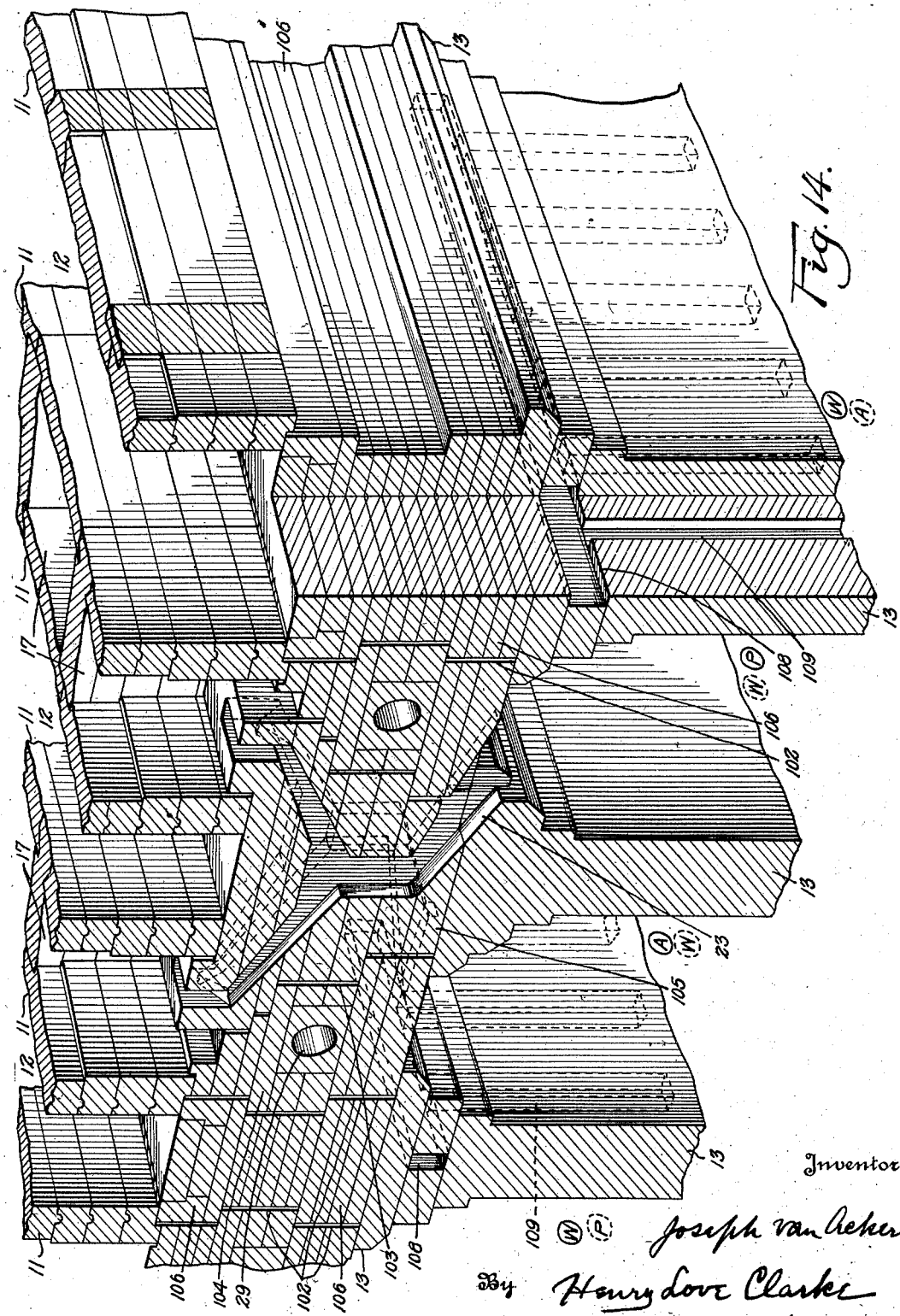

Patented Apr. 8, 1930

1,754,131

UNITED STATES PATENT OFFICE

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA

COKING RETORT OVEN

Application filed May 4, 1923. Serial No. 636,535.

This invention comprehends improvements of general utility in the coking retort oven art; and also comprehends certain improvements especially applicable to coking retort ovens of the Koppers regenerative type having the cross-over principle of flow of the heating gases, as exemplified in the prior Letters Patent of the United States of Joseph Becker, No. 1,374,546, for coking retort oven, dated April 12, 1921.

The invention has for objects the provision of a coking retort oven embodying the cross-over flow principle of the above mentioned prior Becker patent in a structure that may be operated as a combination oven, and yet has the regenerators reduced to about one-half the number shown in the Becker patent. Important characteristics of the invention are: the elimination of any supporting walls other than the usual pillar walls located, according to the present embodiment, beneath the coking chambers; the making of the regenerators wider but also lower, permitting a workman to walk into a regenerator chamber and thereby greatly facilitating repairs and replacements, and also permitting the heating walls and the coking chambers above the regenerators to be made of relatively great height, but with a relatively small increase in the height of the battery structure as a whole; a reduction amounting to approximately one-half of the flow boxes and reversing devices required for controlling and reversing the flow of the various gases through the regenerators and flues; and, as a further feature, the provision of a duct construction that insures instant admixture of the gas and air, when employing for fuel an extraneously derived gas such as producer gas. A further improvement provided by the invention consists in a novel construction and arrangement of the expansion joints in the heating wall and and oven chamber substructure. The expansion joint construction avoids short circuiting between the coke oven gas ducts and the regenerator ducts, avoids leakages from any of the ducts, or mixing of gases which must be kept separate, and yet permits expansion of the entire heating wall and oven chamber substructure, together with the supporting pillar walls, without enforcing displacement of the heating wall structure to an extent sufficient to bring about substantial irregularities in the oven chamber and heating wall dimensions.

The cross-over duct construction permits the employment of a plurality of horizontal flues in each heating wall, instead of the usual single horizontal flue which extends from end to end of the heating wall. In a heating wall provided with a plurality of separate horizontal flues, each horizontal flue need communicate with only part, in the present instance only about one-fifth, of the total number of flame flues. By this construction, there is brought about a proportionate reduction in the volume of flow which must be maintained through the horizontal flue, and a resultant decrease in the size of the horizontal flue. This reduction in size of the horizontal flues has the important advantage that it enables a considerable thickening and strengthening of the walls of the oven structure in the region of the horizontal flues. Moreover, the improved flue construction permits an increase in the height of the flame flues, with a corresponding increase in the height of the coking chambers so that the latter may be made narrower in width, a development greatly facilitating the coking of high volatile coals, and yet the increased volume of combustion products are taken care of, without making it necessary to enlarge the horizontal flue dimensions to sizes inconsistent with adequate strength of the wall construction in the horizontal flue region.

The flue construction of the invention is furthermore of great importance in oven batteries fired with extraneously-derived gas, such as producer gas, which results in an increased volume of combustion products, for the reason that adequate flue spaces must be provided to collect and feed to the down-flow operating flame flues this increased volume. The invention provides adequate accommodation to such increased volume of combustion products, without introducing elements of weakness into the wall structure.

In addition to the objects recited above, the invention comprehends a novel regenerator construction and system of flow therethrough and through the flues, promoting uniformity of distribution and effectively separating and isolating inflow regenerators from outflow regenerators and checking leakages of the inflow gases through the separating walls into the lower-pressure outflow gases that exert suction on any crevices through such walls, and has for other objects such other improvements or advantages in construction and operation as are found to obtain in the structures and devices hereinafter described or claimed.

In the accompanying drawings, forming a part of this specification, and showing, for purposes of exemplification, a preferred form and manner in which the invention may be embodied and practiced, but without limiting the claimed invention to such illustrative instance or instances:

Fig. 4 is a horizontal section taken in the plane indicated by the line G—G of Fig. 3;

Fig. 5 is a horizontal section taken in a plane indicated by the line H—H of Fig. 3;

Fig. 6 is a horizontal section taken in a plane indicated by the line K—K of Fig. 3;

Fig. 7 is an enlarged vertical section taken longitudinally of the battery structure and showing the duct connections between the regenerators and flues;

Fig. 8 is an enlarged vertical section through such duct connection taken crosswise of the battery structure;

Fig. 9 is a fragmentary plan view of the structure in the bottom of a flue;

Fig. 10 is an enlarged fragmentary vertical section taken longitudinally of the battery in planes indicated by the line 10—10 of Fig. 11, illustrating in further detail the duct connections between regenerators and flues and between coke-oven gas ducts and flues, and also illustrating an arrangement of the improved expansion joint construction;

Fig. 14 is a perspective view of the structure shown in enlarged section in Fig. 10, and on the same scale.

The same characters of reference indicate the same parts throughout the several views.

Figure 1:
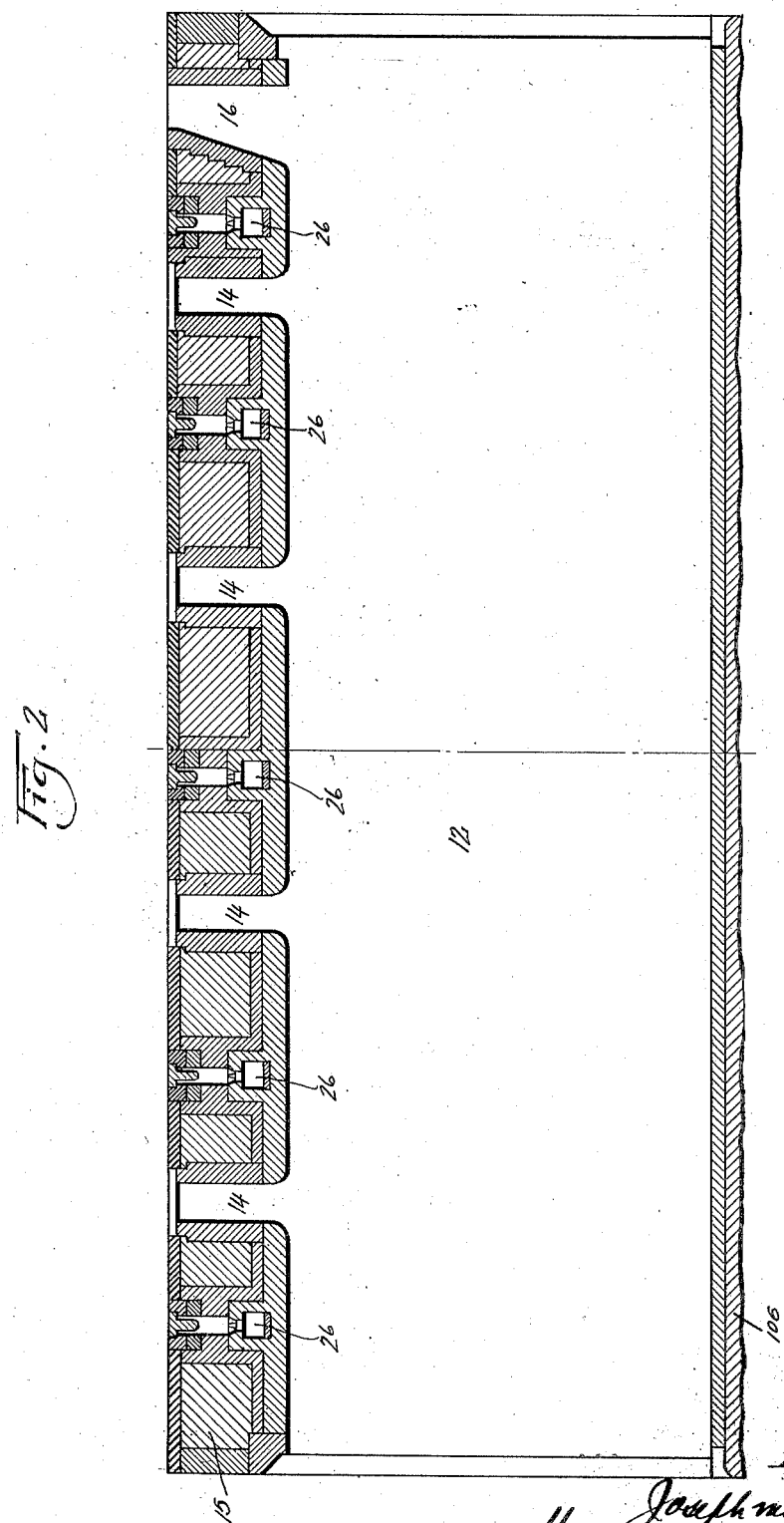
Figure 1 is a crosswise vertical section through a coke oven battery embodying features above specified and equipped with the improvements of the present invention, the view being taken longitudinally through a heating wall and a pair of connected regenerators in planes indicated by the line A—A of Fig. 3.

In the embodiment illustrated in the drawings, the invention is incorporated in a combination coke oven battery, i. e., a battery having provision for being fired alternately with an extraneously derived relatively lean gas, such as producer gas, or with a relatively rich gas, such as coke oven gas. For convenience, the present description will be confined to the present illustrated embodiment of the invention in such a combination oven battery; certain features of the invention may be applied to other structures, for example, to ordinary so-called "coke ovens" fired with coke oven gas, or ordinary so-called "gas ovens" fired with producer gas; hence, the invention is not confined in its scope, except as hereinafter claimed, to the combination oven, nor to the specific use and specific embodiment herein described as an illustrative example.

The by-product coke oven battery shown in the drawings includes the structural feature of a plurality of crosswise elongated spaced heating walls 11, 11, which provide intermediate crosswise elongated coking chambers or retorts 12, 12 of the horizontal chamber oven type. Pillar walls 13, 13 extend crosswise of the battery and according to the present embodiment of the invention, are located respectively, directly beneath the coking chambers. These pillar walls collectively form the main support for the entire superstructure of the battery and are themselves supported upon a flat mat or platform which constitutes the sub-foundation on which the entire battery rests.

Figure 2:
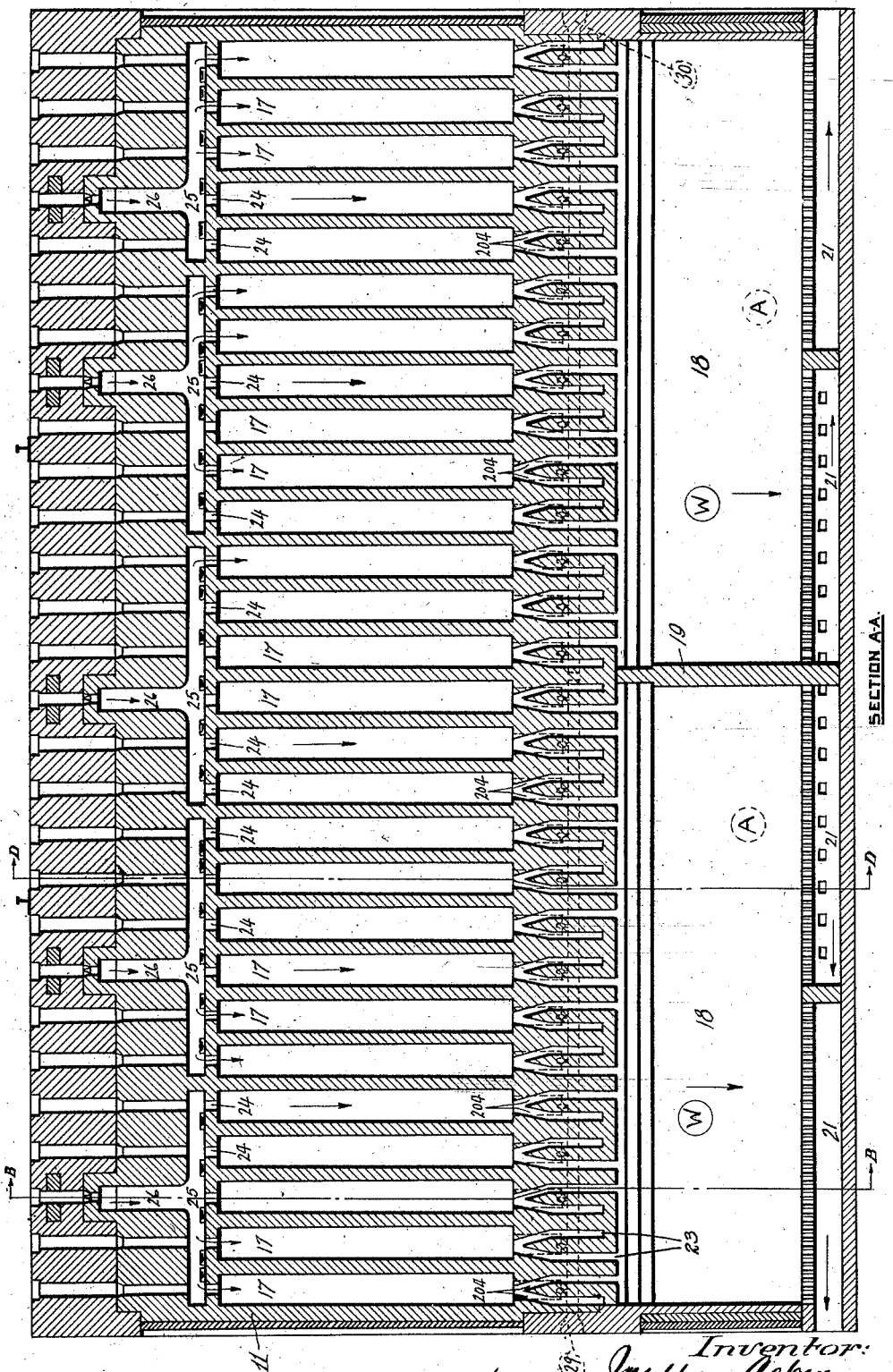
Fig. 2 is a crosswise vertical section taken longitudinally through a coking chamber in planes indicated by the line C—C of Fig. 3.

The coal to be coked is charged into the coking chambers 12 through charging holes 14 located in the top 15 of the battery and positioned directly above the respective coking chambers as shown in Fig. 2. These charging holes 14 are equipped with the usual removable covers for closing the tops of the coking chambers, during the coking or distilling of the coal. The evolved gases and distillation products discharge from the tops of the respective coking chambers 12 through gas outlets 16 and thence through ascension pipes (not shown) into the usual gas collecting main, through which the gases and distillation products pass to the by-product recovery apparatus.

Heat for coking the charges of coal in the several coking chambers 12 is derived from the crosswise heating walls 11, which form the side walls of the coking chambers. Each heating wall 11 is provided with vertical flame or combustion flues 17. As in the Becker patent, the cross-over flow of the heating gases permits all of the flues of each heating wall to operate concurrently as upflow or downflow flues. The heating walls, in respect of the direction of flow through the flues, are grouped into the alternate pairs L that operate concurrently for flow in the same direction, for example, as inflow or burning heating walls, and the intermediate pairs M that operate concurrently for flow in the direction opposite to the pairs L, for example, as outflow heating walls. With regard to the transverse flow duct connections employed in accordance with the cross-over flow principle, as hereinafter explained, the heating walls may be grouped into pairs N, taken seriatim, each pair N being constituted of one heating wall of a pair L and one connected heating wall of the adjacent pair M. With this arrangement, the coking chambers may be, for convenience, grouped into two series, a series of alternate coking chambers C and a series of intermediate coking chambers C'. In any individual coking chamber of the alternate series C, the charge of coal is subjected to heat from both sides and from end to end of the charge during alternate reversal periods, while, during the other reversal periods, waste gas flows through the heating walls on both sides of and from end to end of the charge. In the coking chambers of the intermediate series C', the charge is subjected to the heating effect of the burning flame flues, applied to the full length of one side of said charge, and, then, during a successive reversal period, the heating effect of the burning flame flues is applied to the full length of but from the other side of the charge. It will thus be seen that the adjacent heating walls of two cross-connected pairs in turn constitute simultaneously similarly operating pairs of heating walls.

The crosswise regenerators 18 of the retort oven or battery are located at a lower level than the heating walls 11 and coking chambers 12, and, in the present instance, extend in parallelism between the pillar walls 13. Located in the middle lengthwise vertical plane of the battery, is a vertical partition 19, as shown in Fig. 1, which partition extends from the mat of the battery to the bottom of the overlying coking chamber and interconnects the pillar walls 13. The regenerators, which are respectively located on opposite sides of the battery, extend inwardly to the partition 19 and are separated thereby, as clearly shown in Fig. 1. This arrangement permits control from opposite sides of the battery of the flow through the regenerators, thereby assisting the novel flue arrangement in promoting uniformity of distribution. Each regenerator 18 is a chamber containing the checker brick 20, with distributing sole channels 21 underneath and communicating with the checker work.

In accordance with the invention, the regenerators are each equal in width to the horizontal dimensions between adjacent pillar walls 13, so that each regenerator is somewhat wider than the heating wall. This widening of the regenerators permits a corresponding decrease in their height, and so allows the coking chambers and heating walls to be built as high as efficient operation and quantity production demand, without any unusual increase in the height of the battery structure. Moreover, the regenerators, being exceedingly capacious horizontally, permit a workman to walk through them without difficulty, thereby greatly facilitating repairs and replacements.

During alternate outflow reversal periods, the regenerators are heated by the hot combustion products from the flame flues and, during the other inflow reversal periods, the heat so stored in the regenerators is imparted to the medium, which passes through the regenerators into the flame flues. According to the invention, the several regenerators, taken longitudinally of the battery, are grouped into the alternate pairs R corresponding with and operating for flow in the same direction as the alternate pairs L of heating walls, and into intermediate pairs S of regenerators corresponding with and operating for flow in the same direction as the intermediate pairs M of heating walls. When the regenerators R and heating walls L operate for inflow, the heating walls M and regenerators S operate for outflow. On reversal of the battery, the inflow regenerators and heating walls are switched to outflow operation, and the outflow heating walls and regenerators are switched to inflow operation.

Each regenerator is provided with a series of ducts 23 which respectively lead into forks 203, one branch 204 of which leads into one heating wall of the pair corresponding to the regenerator, and the other branch 205 of which leads into the other heating wall of the same pair. Inasmuch as, taken longitudinally of the battery, a pair of regenerators corresponds to each pair L or M of heating walls, and each regenerator is connected by the forked duct means above described with the flues of both heating walls of the pair, it follows that the flues of each heating wall have duct connections with two separate regenerators. This construction makes it unnecessary to provide a pair of regenerators for each individual heating wall, thus permitting the wide regenerator structure hereinbefore referred to.

In a form of the invention illustrated in Fig. 7, there is provided in the refractory structure above the branching point of each fork 203, a socket or recess 207 having the oppositely downwardly diverging sides 208 with rounded corners 209. As the gas or air passes upwardly from the duct 23, it will enter the socket 207 and be deflected down the diverging sides 208 and around the corners 209, in two equally distributed streams, thereby promoting uniformity of distribution in the two flues which are supplied from a single regenerator.

The hereinbefore described duct connections between regenerator and heating walls permit operation of the battery alternatively with a relatively rich gas, such as coke oven gas, or with a preheated relatively lean extraneously derived gas, such as producer gas, according to the combination oven principle, although the number of regenerators and their attendant flow boxes and reversing devices have been reduced in number approximately one-half. By this considerable reduction in number of the flow boxes and reversing devices, an important saving is effected, not only in respect of the cost of installation, but also in the operating expense.

Figure 11:
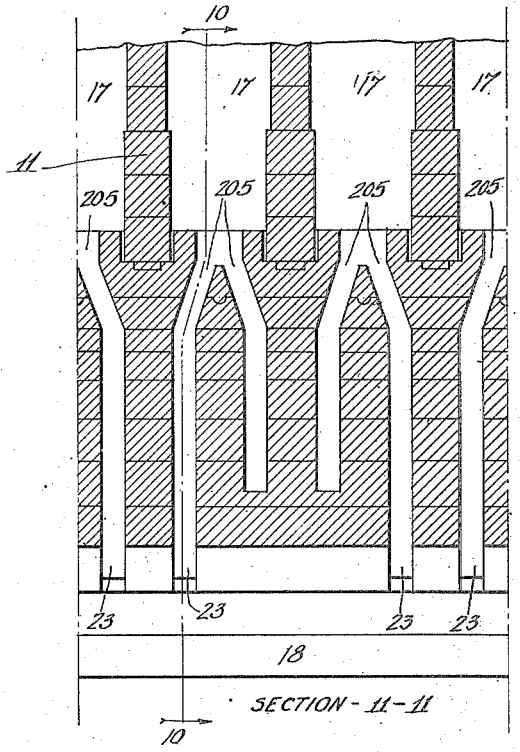
Fig. 11 is a vertical section taken cross-wise of the battery taken in planes indicated by the line 11—11 of Fig. 10.
Figure 12:
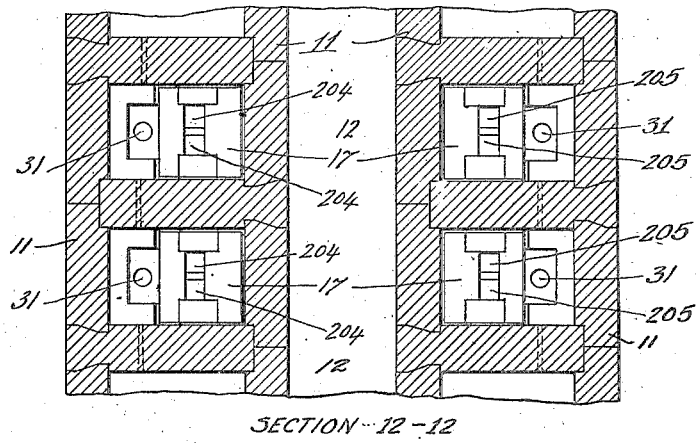
Fig. 12 is a horizontal section through the heating walls taken in a plane indicated by the line 12—12 of Fig. 10; and, Fig. 13 is a longitudinal vertical section on a reduced scale of the structure illustrated in Figures 10 to 12 inclusive.

As shown in Figs. 1 and 11, the upper ends of the fork branches 204 or 205 leading from separate regenerators into the flues of the same heating wall incline toward each other. This construction is attained preferably by plugs 206 having inclined sides, the plugs being positioned in the flow spaces at the bottoms of the respective flues and being arranged in pairs in the flues to give the converging inclination to the duct branches from separate regenerators. As shown in Figs. 8 and 9, the plugs 206 are held in place merely by their projecting portions $208^1$ resting on the opposite inclined edges $209^1$ at the bottom of the flue; thus the plugs 206 are readily removable, if it be desired to increase the capacity of the flow ducts between regenerators and flues. The converging inclination of the ducts 204 or 205 insures instant admixing of the fuel gas and air and consequent immediate ignition in the extreme bottom of the flue, inasmuch as one duct branch leads, when the battery is fired with producer gas, from an air regenerator and the other duct branch from a separate fuel gas regenerator.

Each flame flue 17 of each heating wall has at its top a port or opening 24 for draft and the passage of combustion products or waste gases. These ports 24 connect the flame flues 17 with the horizontal or bus flues 25 located in the heating walls above the flames and connecting together the latter in groups. There are in each heating wall a plurality of, in the present instance five, of the horizontal flues 25 arranged in endwise relation to each other. On account of the division of the flow above the flame flues into a plurality of horizontal flues 25, the individual horizontal flues are not required to be of so great capacity as that necessary in present practice and consequently the cross-sectional area of each horizontal flue 25 may be materially reduced proportionately with the reduced number of connected flame flues, with the result that the thickness and strength of the heating walls are substantially increased in the region of the horizontal flues. Moreover, because of the fact that the necessity for redistribution of the flow between horizontal flues and flame flues is confined to a reduced number of flame flues, in the present instance only about one-fifth of the total number of flame flues in a heating wall, uniformity in distribution of the flow between flame flues and regenerators throughout the battery is greatly promoted.

In accordance with the Becker cross-over principle, the respective horizontal flues 25 of each heating wall are communicably connected individually by means of cross connecting passageways or ducts 26 with the corresponding horizontal flues of one of the next adjacent heating walls. These channels 26 are preferably connected to the horizontal flues 25 at approximately the middle portions of the latter, as shown in Fig. 1, and extend longitudinally of the oven battery, as shown in Fig. 2. Thus all the flame flues of a heating wall are connected by these ducts 26 across the intervening coking chamber with all the flame flues of one adjacent heating wall and the gases flowing upwardly in any group of flame flues of a heating wall pass over and flow downwardly in the corresponding connected group of flame flues of the adjacent heating wall.

Extending crosswise of the battery in each pillar wall 13 and located beneath the heating wall 11, is a pair of endwise positioned coke oven or relatively rich gas-supply channels 29 and 30. These channels respectively communicate by gas ducts 31 with the several flame flues on the opposite sides of the central longitudinal plane of the battery. Within the several ducts are located the usual nozzles 32. The supply of coke oven gas to the respective channels 29 and 30 may be derived from coke oven gas mains of the usual type which extend longitudinally at the opposite sides of the battery. Suitable mechanism is provided for controlling the supply of fuel gas to the channels 29 and 30, as required by battery operation.

When firing the battery with extraneously-derived lean gas, such as producer gas, all the gas channels 29 and 30 are cut off from the coke oven gas supply. Assuming that the alternate pairs R and L of regenerators and connected heating walls are operating for inflow and that the intermediate pairs M and S of heating walls and regenerators are operating for outflow, a supply of producer gas is permitted to flow into one regenerator P of each alternate pair R. Passing through said regenerators P, the producer gas is preheated before being delivered into the burning flame flues. During the inflow of producer gas through such regenerators P, inflow of air is maintained in the other regenerators A of the alternate pairs R. The air passing upwardly through the regenerators A finally enters the burning flame flues to support the combustion of the producer gas that is delivered thereto by the regenerators P. During the inflow through the regenerators R and the connected flues of the heating walls L, the waste gas from the outflow operating flues of the intermediate pairs M is flowing out through both regenerators of the connected intermediate pairs S, so that said regenerators S operate as waste gas regenerators W. On reversal of the flow, the inflow operating regenerators become outflow regenerators and concurrently the outflow operating regenerators become inflow regenerators.

Figure 3:
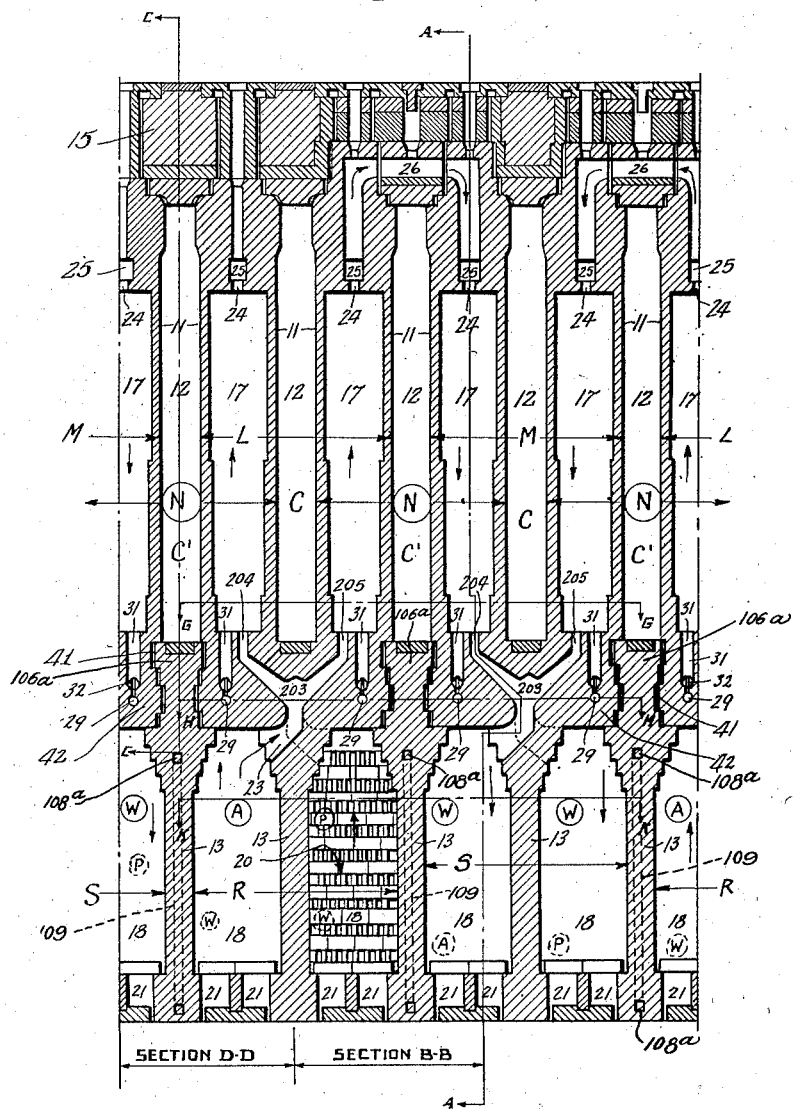
Fig. 3 is a composite vertical sectional elevation taken longitudinally of a coke oven battery, in planes indicated by the lines D—D and B—B of Fig. 1.

The enlarged views in the drawings, particularly Figs. 10 and 7, show that the pillar walls 13 between inflow regenerator pairs R and outflow regenerator pairs S (but not the alternate pillar walls 13 between the two regenerators of each such pair) have in their masonry horizontal vent passages 108 that extend lengthwise of such walls and branch into vertical passages 109 extending down in said walls. These vent passages are similar to vent passages that commonly penetrate the end abutments of coke oven batteries for cooling purposes (for example, as shown in Figs. 3, 4 and 5 of my Patent 1,312,-372); but here serve a different purpose. These passages 108—109 interrupt pressure differentials that might exist through any crevices from the inflow gas side to the lower pressure outflow waste-gas side of such regenerator walls and that would tend to suck gas from the inflow regenerators into the adjacent waste-gas regenerators. Such vent passages within the masonry of the pillar walls that separate the inflow from the outflow regenerators operate in effect (like a break in a siphon) to break the low-pressure or vacuum line that would be established, and progressively become aggravated, through joints that may be opened or crevices that may be formed by the expansion or contraction or settling of the pillar walls and that may penetrate from the inflow regenerators through to the low-pressure or suction condition necessarily present in the adjacent outflow regenerators and so cause loss of gas from the inflow regenerators and also the jeopardy of mixing fuel-gas with the surplus air carried along in the waste-gas that is outflowing down through the highly heated outflow regenerator chambers. As the drawings show, such vent passages are not present or needed in the alternate pillar walls 13 that are between two inflow regenerators; because there is little or no pressure differential between these regenerators, which flow in the same direction and are equally distant from the stack-draft; whereas an outflow regenerator is much nearer the stack than is an adjoining inflow regenerator, and so in much lower pressure or suction condition. The pillar walls 13 that do have the vent passages 108—109 are those that integrally bear and continue upward into the masonry units 106 (Fig. 10, or 106$^a$, Fig. 7) that laterally face on either side the expansion joints 102 (Fig. 10, or 41, Fig. 7), effectively separating the gas-duct-carrying masonry units 104—105 on the one side, of each such unit 106, from the units 104—105 on the other side of it, the units on such opposite sides operating concurrently for inflow gases and outflow gases, respectively, in correspondence with the inflow and outflow regenerators with which their ducts connect. And thus each vented pillar wall 13 with its integrally surmounting masonry unit 106 (or 106$^a$), flanked by the expansion joints 102 (or 41) forms all the way up to the flame-flues an effective isolation of the inflowing gases on the one side from the outflowing waste-gases on the other side, as to the adjoining counterflowing regenerators and as to the corresponding gas-ducts above them. And the coking-chamber itself that is directly above said unit 106, on the vented pillar wall 13, separates the up-burning flame-flues on its one side from the down-flowing waste-gas-filled flame-flues on its opposite side, and so completes the isolation of the upwardly inflowing gases from the adjacent lower-pressure downwardly counterflowing waste-gases, on the respectively opposite sides of each crossover flow-path in the battery.

In operating the battery with coke oven gas, the supply of producer gas to regenerators P is shut off and air is permitted to flow into such regenerators in place of the producer gas. During coke oven gas operation, a supply of coke oven gas is maintained in the channels 29 and 30 which feed the upburning flues. The reversing mechanism is operated at each reversal to place all of the inflow operating regenerators in communication with the outer air and concurrently all of the outflow operating regenerators in communication with the exhaust.

An arrangement of the improved expansion joint construction is illustrated in Figs. 10 and 13. As shown in said figures, the expansion joints in the structure 101 between the top level of the regenerators and the base of the heating walls 11 are so arranged that separate units of expansion are provided in this structure, whereby adequate expansion is permitted, without any danger of enforcing displacement of the heating wall structure to an extent sufficient to bring about substantial irregularities in the oven chamber and heating wall dimensions, or the occurrence of cracks which might result in short circuiting or leakages of the heating gases. In the structure 101 vertical expansion joints 102 are provided in pairs above the alternate pillar walls which do not carry the feed ducts 23; vertical expansion joints 103 are provided in pairs above the intermediate pillar walls which carry said ducts 23. This arrangement of the expansion joints provides separate units of expansion 104 for the coke oven gas channels and ducts 31, separate units of expansion 105 for the regenerator ducts 23 and 203, and separate units of expansion 106 above the alternate pillar walls which do not carry the regenerator ducts. Moreover, expansion joints 107 are also provided between the bases of the heating walls 11 and the top of the structure 101. All of said expansion joints hereinbefore described are staggered either vertically or horizontally as may be necessary to avoid leakages from gas flow channels or ducts. The improved construction and arrangement of the expansion joints permits the entire structure below the bases of the heating walls to expand, as required, and yet avoids leakages and substantial displacement of any of the heating walls.

As shown in Figs. 3 and 7, the expansion joints 41 of the heating wall and oven chamber substructure 42 are located only above the intermediate pillar walls 13 which are between the pairs R, S of regenerators, there being no expansion joints above the alternate pillar walls that are located between the two regenerators of any pair R or S. With this construction, expansion joints are avoided in those pillar walls that have the duct connections between the pairs of regenerators and the pairs of simultaneously-operating flued heating walls. Thus the alternate pillar walls and the pairs of heating walls connected with regenerators through the ducts 23 may expand or contract as a unitary structure, without any danger whatever of mixing gases in a region where it is of prime importance, especially during the inflow, to keep the gases separated.

The invention as hereinabove set forth is embodied in a particular form of construction but may be variously embodied within the scope of the claims hereinafter made.

I claim:

1. In a coke oven battery, in combination: a series of alternate horizontal coking chambers and heating walls therefor arranged laterally of each other, each of said heating walls comprising vertical combustion flues; a plurality of horizontal flues in each of said heating walls and resepectively connecting a plurality of the combustion flues of their respective heating walls; the horizontal flues being also communicably connected with the horizontal flues of one of the adjacent heating walls so that the heating walls are operatively connected in pairs; and a series of crosswise regenerators, each as wide as but not as great in vertical dimensions as each of said heating walls, the regenerators being grouped in parallel in pairs of contiguous regenerators, with the alternate pairs operable in alternation with the intermediate pairs for inflow and outflow, each regenerator being connected by forked duct means with combustion flues of both of two adjacent heating walls comprising one heating wall of each of two of the connected pairs thereof, and each of the combustion flues in each of the heating walls having flow connection by said forked duct means with a pair of said regenerators adapted to operate in parallel with each other for gas flow simultaneously in the same direction, each of the pairs of regenerators when operable for inflow being jointly operable for conveying air to the flues or separately operable for conveying air and an extraneously derived gas; substantially as specified.

2. In a coke oven battery, in combination: a series of alternate horizontal coking chambers and heating walls therefor arranged laterally of each other, each of said heating walls comprising vertical combustion flues; a plurality of horizontal flues in each of said heating walls and respectively connecting a plurality of the combustion flues of their respective heating walls; the horizontal flues being also communicably connected over one of said coking chambers with the horizontal flues of one of the adjacent heating walls, so that the heating walls are operatively connected in pairs; and a series of cross-wise regenerators, the regenerators being grouped in parallel into pairs of contiguous regenerators, with the alternate pairs operable in alternation with the intermediate pairs for inflow and outflow, each regenerator being connected by a forked duct means with combustion flues of both of two adjacent heating walls comprising one heating wall of each of two of the connected pairs thereof, and each of the combustion flues in each of the heating walls having flow connection by said forked duct means with a pair of regenerators adapted to operate in parallel with each other for gas flow simultaneously in the same direction, each of the pairs of regenerators when operable for inflow being jointly operable for conveying air to the flues or separately operable for conveying air and an extraneously derived gas; substantially as specified.

3. In a coke oven battery, in combination: a series of alternate horizontal coking chambers and heating walls therefor arranged laterally of each other, each of said heating walls comprising vertical combustion flues; a plurality of horizontal flues in each of said heating walls and respectively connecting a plurality of the combustion flues of their respective heating walls; the horizontal flues being also communicably connected with the horizontal flues of one of the adjacent heating walls, so that the heating walls are operatively connected in pairs; and a series of crosswise regenerators, each as wide as but not as great in vertical dimensions as each of said heating walls, the regenerators being grouped in parallel into pairs of contiguous regenerators, with the alternate pairs operable in alternation with the intermediate pairs for inflow and outflow, each regenerator being connected by a forked duct means with combustion flues of both of two adjacent heating walls comprising one heating wall of each of two of the connected pairs thereof, and each of the combustion flues in each of the heating walls having flow connection by said forked duct means with a pair of regenerators adapted to operate in parallel with each other for gas flow simultaneously in the same direction.

4. In a coke oven battery, in combination: a series of alternate horizontal coking chambers and heating walls therefor arranged laterally of each other, each of said heating walls comprising vertical combustion flues; a plurality of horizontal flues in each of said heating walls and respectively connecting a plurality of the combustion flues of their respective heating walls; the horizontal flues being also communicably connected over one of said coking chambers with the horizontal flues of one of the adjacent heating walls, so that the heating walls are operatively connected in pairs; and a series of cross-wise regenerators, the regenerators being grouped in parallel into pairs of contiguous regenerators, with the alternate pairs operable in alternation with the intermediate pairs for inflow and outflow, each regenerator being connected by a forked duct means with combustion flues of both of two adjacent heating walls comprising one heating wall of each of two of the connected pairs thereof, and each of the combustion flues in each of the heating walls having flow connection by said forked duct means with a pair of regenerators adapted to operate in parallel with each other for gas flow simultaneously in the same direction.

5. A coke oven battery having side-by-side coking chambers with intermediate flued heating walls and reversible regenerators serving said walls, characterized by the heating walls being operatively connected in pairs by duct means extending transversely over an intervening coking chamber and communicating with the flues of two of the heating walls that are on opposite sides of the coking chamber and by each regenerator being connected by forked duct means with combustion flues of both of two adjacent heating walls comprising one heating wall of each of two of the connected pairs thereof, and by each of the combustion flues in each of the heating walls having flow connection by said forked duct means with a pair of regenerators adapted to operate in parallel with each other for gas flow simultaneously in the same direction.

6. A coke oven battery having side-by-side coking chambers with intermediate flued heating walls and reversible regenerators serving said walls, characterized by the heating walls being operatively connected in pairs by duct means extending transversely over an intervening coking chamber and communicating with the flues of two of the heating walls that are on opposite sides of the coking chamber and by each regenerator being connected with combustion flues of both of two adjacent heating walls comprising one heating wall of each of two of the connected pairs thereof and by each of the combustion flues in each of the heating walls having flow connection with a pair of regenerators adapted to operate in parallel with each other for gas flow simultaneously in the same direction.

7. A coke oven battery having side-by-side coking chambers with intermediate flued heating walls, characterized by the heating walls being operatively connected in pairs by duct means extending transversely over an intervening coking chamber and communicating with the flues of two of the heating walls that are on opposite sides of the coking chamber and by each regenerator being connected with combustion flues of both of two adjacent heating walls comprising one heating wall of each of two of the connected pairs thereof, and by each of the combustion flues in each of the heating walls having flow connection with a pair of regenerators adapted to operate in parallel with each other for gas flow simultaneously in the same direction, each of the pairs of regenerators when operable for inflow being jointly operable for conveying air to the flues or separately operable for conveying air and an extraneously derived gas; substantially as specified.

8. In a coke oven battery, in combination: a series of alternate coking chambers and heating walls therefor arranged laterally of each other, each of said heating walls comprising combustion flues, the flues of each of said heating walls being communicably connected with the flues of one of the adjacent heating walls, so that the heating walls are operatively connected in pairs; and a series of regenerators, each as wide as but not as great in vertical dimensions as each of said heating walls, the regenerators being grouped in parallel into pairs of contiguous regenerators, with the alternate pairs operable in alternation with the intermediate pairs for inflow and outflow, each regenerator being connected by a forked duct means with combustion flues of both of two adjacent heating walls comprising one heating wall of each of two of the connected pairs thereof, and each of the combustion flues in each of the heating walls having flow connection by said forked duct means with a pair of regenerators adapted to operate in parallel with each other for gas flow simultaneously in the same direction, each of the pairs of regenerators when operable for inflow being jointly operable for inflow of air to the flues or separately operable for inflow of air and an extraneously derived gas.

9. In a coke oven battery, in combination: a series of alternate coking chambers and heating walls therefor arranged laterally of each other, each of said heating walls comprising combustion flues, the flues of each of said heating walls being communicably connected over one of said coking chambers with the flues of one of the adjacent heating walls, so that the heating walls are operatively connected in pairs; and a series of regenerators, the regenerators being grouped in parallel into pairs of contiguous regenerators, with the alternate pairs operable in alternation with the intermediate pairs for inflow and outflow, each regenerator being connected with combustion flues of both of two adjacent heating walls comprising one heating wall of each of two of the connected pairs thereof, and each of the combustion flues in each of the heating walls having flow connection with a pair of regenerators adapted to operate in parallel with each other for gas flow simultaneously in the same direction.

10. In a coke oven battery, in combination: a series of alternate coking chambers and heating walls therefor arranged laterally of each other, each of said heating walls comprising combustion flue means, the flue means of each of said heating walls being communicably connected with the flue means of one of the adjacent heating walls, so that the heating walls are operatively connected in pairs; and a series of regenerators, each as wide as but not as great in vertical dimensions as each of said heating walls, the regenerators being grouped in parallel into pairs of contiguous regenerators with the alternate pairs operable in alternation with the intermediate pairs for inflow and outflow, each regenerator being connected with combustion flue means of both of two adjacent heating walls comprising one heating wall of each of two of the connected pairs thereof, and each of the combustion flue means in each of the heating walls having flow connection with a pair of regenerators adapted to operate in parallel with each other for gas flow simultaneously in the same direction.

11. In a coke oven battery, in combination: a series of alternate coking chambers and heating walls therefor arranged laterally of each other, each of said heating walls comprising combustion flues all of which are communicably connected over one of said coking chambers with the flues of one of the adjacent heating walls, so that the heating walls are operatively connected in pairs; and a series of regenerators, the regenerators being grouped in parallel into pairs of contiguous regenerators, with the alternate pairs operable in alternation with the intermediate pairs for inflow and outflow, each regenerator being communicably connected by a forked duct means with combustion flues of both of two adjacent heating walls comprising one heating wall of each of two of the connected pairs thereof, and each of the combustion flues in each of the heating walls having flow connection by said forked duct means with a pair of regenerators adapted to operate in parallel with each other for gas flow simultaneously in the same direction.

12. In a coke oven battery, in combination: a series of alternate coking chambers and heating walls therefor arranged laterally of each other, each of said heating walls comprising combustion flues all of which are communicably connected over one of said coking chambers with the flues of one of the adjacent heating walls, so that the heating walls are operatively connected in pairs; and a series of regenerators, the regenerators being grouped in parallel into pairs of contiguous regenerators, with the alternate pairs operable in alternation with the intermediate pairs for inflow and outflow, each regenerator being connected with combustion flues of both of two adjacent heating walls comprising one heating wall of each of two of the connected pairs thereof, and each of the combustion flues in each of the heating walls having flow connection with a pair of regenerators adapted to operate in parallel with each other for gas flow simultaneously in the same direction, each of the pairs of regenerators when operable for inflow being jointly operable for conveying air to the flues or separately operable for conveying air and an extraneously derived gas.

13. In a coke oven battery having side-by-side coking chambers with intermediate flued heating walls grouped into simultaneously similarly operable pairs, pillar walls directly beneath each of the coking chambers and parallel with the heating walls, and regenerators beneath the heating walls and disposed in pairs each pair comprising two contiguous regenerators disposed on opposite sides respectively of a pillar wall directly under one of the coking chambers that is between the two heating walls of a simultaneously similarly operable pair, and having the regenerators of each of the pairs connected with the flues of both of the heating walls of the simultaneously similarly operable pair on opposite sides of a coking chamber directly above the pillar wall between the two regenerators of the pair by duct means extended out from each regenerator of the pair through the pillar wall and heating wall substructure between the two heating walls of the pair, the improvement characterized by expansion joints located in the substructure between the bases of the heating walls and the top level of the regenerators, said expansion joints being arranged in pairs above each pillar wall and with the joint of the pairs above each of the pillar walls through which the regenerator ducts extend disposed between the regenerator ducts and the contiguous portions of the bases of the heating walls to which they extend, whereby each of the heating walls and each of the coking chambers between each two adjacent heating walls may expand or contract as individual units without short-circuiting from one regenerator duct to another regenerator duct of gaseous media flowing through the regenerator duct connections between the regenerators and the combustion flues.

14. In a coke oven battery having side-by-side coking chambers with intermediate flued heating walls, characterized by the heating walls being operatively connected in pairs transversely over an intervening coking chamber and also grouped into simultaneously similarly-operable pairs respectively constituted of one heating wall of each of two of the connected pairs, in combination with pairs of regenerators the members of which respectively serve both heating walls of the simultaneously similarly-operable pairs; substantially as specified.

15. A coke oven battery having side-by-side coking chambers with intermediate flued heating walls, characterized by the heating walls being operatively connected in pairs transversely over an intervening coking chamber and also grouped into simultaneously similarly-operable pairs respectively constituted of one heating wall of each of two of the connected pairs, in combination with pairs of regenerators located directly beneath the heating walls and the members of which regenerator pairs respectively serve both heating walls of the simultaneously similarly-operable pairs; substantially as specified.

16. In a coke oven battery having side-by-side coking chambers with intermediate flued heating walls grouped into simultaneously similarly-operable pairs, and pairs of regenerators below the heating walls, the regenerators of a pair being separated by a pillar wall, connected with said simultaneously similarly-operable pairs of heating walls by duct means extended out through the pillar wall and heating wall sub-structure, that is, between the two heating walls of a simultaneously similarly-operable pair, and fuel gas duct means for supplying to the flues fuel gas independently of the regenerators; the improvement characterized by expansion joints located in the structure between the bases of the heating walls and the top level of the regenerators, said expansion joints being arranged in pairs above each pillar wall and providing separate expansion units for the regenerator ducts and separate expansion units for the fuel gas duct means, each unit carrying regenerator ducts and each unit carrying fuel gas duct means being separated by expansion joints from the other parts of the expansible structure; substantially as specified.

17. The combination as defined by claim 5, having the two sets of ducts of a pair of regenerators co-axially arranged with respect to an axis extending transversely of the battery; substantially as specified.

18. In a coke oven battery having coking chambers, intermediate flued heating walls, pillar walls below the coking chambers and heating walls and parallel with the heating walls for supporting the coking chambers and heating walls, regenerators between the pillar walls communicably connected with the flues of said heating walls by duct means extending to the flues of two heating walls on opposite sides of an intervening coking chamber through both the coking chamber substructure and through the portions of the substructure of the respective heating walls adjacent the substructure of the coking chamber intervening said two heating walls, the improvement characterized by expansion joints separating the substructure under one of the coking chambers and a portion of each of the substructures under the two heating walls of opposite sides of and contiguous to the coking chamber that jointly carry said duct means for the flues of said two heating walls on opposite sides of said chamber from the remaining portions of the substructure of said two heating walls whereby the several portions of the coking chamber and heating wall substructures may expand and contract as individual unitary structures without short-circuiting from one regenerator duct to another of gaseous media flowing through the regenerator duct connections between the regenerators and the flues of said two heating walls.

19. The combination defined in claim 18, and in which the pillar walls for supporting the coking chambers and heating walls are located directly under coking chambers, and in which each of the regenerator ducts that extend through the coking chamber substructure passes through the tops of said pillar walls to the flues of both of the heating walls on opposite sides of the coking chamber above the respective pillar walls.

20. In a coke oven battery in combination: coking chambers; intermediate flued heating walls communicably connected into consecutive pairs with each other by duct means extending over an intervening coking chamber between said heating walls and communicating with the flues of two of the heating walls that are on opposite sides of the coking chamber and connecting means for supplying air and gas to the flues of the latter and removing waste gas therefrom; said connecting means being operable to cause the flow of gas in consecutive pairs of heating walls to be clockwise in one pair and simultaneously anti-clockwise in one of the adjacent pairs of heating walls; and regenerators for preheating the air and gas and for conveying off the waste gases, respectively, each regenerator being in communication with the flues of two adjacent heating walls of two of the adjacent pairs of heating walls.

21. In a coke oven battery, in combination: coking chambers; intermediate flued heating walls communicably connected into pairs with each other by duct means extending over an intervening coking chamber between said heating walls and communicating with the flues of two of the heating walls that are on opposite sides of the coking chamber; regenerator connecting means for supplying air and gas to the flues of said walls and removing waste gas therefrom; the connections being operable to cause some of the coking chambers to be heated by flame on both sides simultaneously while other coking chambers are heated by flame on one side and by waste gas on the opposite side and means for reversing the flow of the gases; and air and gas regenerators that are each in communication through said connecting means with the flues on both of the opposite sides of a coking chamber; substantially as specified.

22. A coke oven battery having side-by-side coking chambers with intermediate flued heating walls and regenerators serving said walls, characterized by the flues of the heating walls being operatively connected in groups transversely over intervening coking chambers and by each regenerator being connected with combustion flues of each of a plurality of adjacent heating walls comprising one heating wall of each of a plurality of the connected groups thereof, and by each of the combustion flues in each of the heating walls having flow connection with a plurality of regenerators adapted to operate in parallel with each other for gas flow simultaneously in the same direction; substantially as specified.

23. The combination as defined by claim 22, in which the regenerators are arranged crosswise of the battery; substantially as specified.

24. In a coke oven battery, in combination: coking chambers; intermediate flued heating walls communicably connected with each other over one of said coking chambers between said heating walls and provided with substantially parallel sets of combustion flues; regenerators for delivering pre-heated air and fuel gas and for removing waste gas from said flues, a fuel gas regenerator being connected to feed the gas to two consecutive sets of flues respectively on opposite sides of one of the coking chambers to effect the flow of all of the gas in the corresponding heating walls in the same direction.

25. A coke oven battery having side-by-side coking chambers with intermediate flued heating walls and reversible regenerators serving said walls, characterized by the heating walls being operatively connected in pairs across an intervening coking chamber so that all flow may be upward in one wall and downward in the other wall of each pair during each reversal period and by each regenerator being connected with the flues of one heating wall of each of two of the connected pairs thereof, and by each of the heating walls having flow connection with a pair of regenerators adapted to operate in parallel with each other for gas flow simultaneously in the same direction; substantially as specified.

26. In a coking retort oven battery having a row of side-by-side coking chambers with intermediate flued heating walls, regenerators beneath said coking chambers and heating walls, duct means extending through the substructure between the regenerators and the coking chambers and communicably connecting the regenerators with the flues of the heating walls, and fuel gas duct means in the base substructure of each heating wall for supplying to the flues therein fuel gas independently of the regenerators and arranged in alternation lengthwise of said row with the regenerator ducts; the improvement characterized by expansion joints located in the structure between the bases of the heating walls and the top level of the regenerators, said expansion joints being arranged therein to provide separate expansion units for the regenerator ducts and separate expansion units for each of the fuel gas duct means, each unit carrying regenerator ducts and each unit carrying a fuel gas duct means being separated by expansion joints from the other parts of the expansible structure; substantially as specified.

27. In a coke oven battery having side-by-side coking chambers with intermediate heating walls respectively comprising vertical combustion flues, horizontal flow duct means in each heating wall and respectively connecting a plurality of the vertical combustion flues of their respective heating walls at the upper portions of said combustion flues, the horizontal flow duct means in each wall being also communicably connected with the horizontal flow duct means in an adjacent wall by duct means extending across alternate coking chambers, pillar walls directly below each of said coking chambers, crosswise regenerators between the pillar walls and disposed in pairs each comprising two regenerators adapted to operate in parallel for gas flow simultaneously in the same direction and respectively disposed on opposite sides of a pillar wall below an intermediate coking chamber, and each regenerator of a pair of regenerators respectively on opposite sides of a pillar wall below an intermediate coking chamber communicably connected with both heating walls on opposite sides of said coking chamber by duct means extending through the superstructure of the pillar wall below said chamber: the improvement comprising expansion joints in the substructure between the alternate coking chambers and their respective pillar walls, and expansion joints in the substructure between the intermediate coking chambers and their respective pillar walls, whereby the entire structure below the bases of the heating walls may expand without short circuiting from one duct to another of gaseous media flowing through the regenerator duct connections between the regenerators and heating walls that extend through the superstructure of pillar walls below intermediate coking chambers; substantially as specified.

28. A coke oven battery having side-by-side coking chambers with intermediate flued heating walls and regenerators serving said walls, characterized by the heating walls being operatively connected, for flow in series, by duct means extending transversely over intervening coking chambers so as to provide two sets of heating walls operable in alternation with each other for inflow combustion and outflow of combustion products, and by certain of the regenerators being each connected with flues of heating walls of adjacent groups and that comprise heating walls of the same set of one of the two sets thereof and by each of the other regenerators being each connected with flues of heating walls of adjacent groups and that comprise heating walls of the same set but of the other of the two sets thereof; substantially as specified.

29. In a coking retort oven battery, the combination with a series of side-by-side coking chambers and intermediate heating walls, having combustion flues, and a series of side-by-side regenerators communicably connected by ducts with said combustion flues and operatively disposed in side-by-side groups adapted to serve in alternation for inflow preheating of fuel gas and air simultaneously and for concurrent waste-gas outflow with masonry partition walls separating said groups, of vent passages in the said partition walls, whereby joints or crevices therein through which gas leakage may be induced from an inflow gas regenerator to an outflow waste-gas regenerator, by pressure differential across said partition wall, may be interrupted by said vent passages and said pressure differential may be thereby broken in said partition wall.

30. In a coking retort oven battery, the combination with a series of side-by-side coking chambers and intermediate heating walls, having combustion flues, and a series of side-by-side regenerators communicably connected by ducts with said combustion flues and operatively disposed in two sets operable in alternation with each other for inflow of combustion media and for concurrent outflow of waste gases, with inflow regenerators alternating in position side-by-side with outflow regenerators and separated therefrom by masonry partition walls, of vent passages in said partition walls that separate inflow regenerators from outflow regenerators; whereby joints or crevices through said partition walls, through which leakage may be induced from inflow regenerators to outflow regenerators adjoining said partition walls, by pressure differential between the inflow and outflow regenerators, may be interrupted by said vent passages and said pressure differential may be thereby broken in said partition walls.

31. In a coking retort oven battery, the combination as claimed in claim 30 and in which the vent passages penetrate the regenerator partition walls substantially horizontally of their length and are extended substantially vertically within their masonry and are separated from the combustion flues by substantially integral masonry.

In testimony whereof I have hereunto set my hand.

JOSEPH van ACKEREN.